US010287932B2

(12) United States Patent
Patel

(10) Patent No.: US 10,287,932 B2
(45) Date of Patent: May 14, 2019

(54) CAMSHAFT PHASING SYSTEM INCLUDING IDLER GEAR PHASER FOR INTERNAL COMBUSTION ENGINES

(71) Applicant: Schaeffler Technologies AG & Co. KG, Herzogenaurach (DE)

(72) Inventor: Dipan Patel, Livonia, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 165 days.

(21) Appl. No.: 15/269,517

(22) Filed: Sep. 19, 2016

(65) Prior Publication Data
US 2018/0080352 A1    Mar. 22, 2018

(51) Int. Cl.
| | |
|---|---|
| *F01L 1/34* | (2006.01) |
| *F01L 1/344* | (2006.01) |
| *F16H 57/04* | (2010.01) |
| *F01L 1/02* | (2006.01) |
| *F16H 35/00* | (2006.01) |
| *F01L 1/047* | (2006.01) |

(52) U.S. Cl.
CPC ............ *F01L 1/3442* (2013.01); *F01L 1/026* (2013.01); *F16H 35/008* (2013.01); *F16H 57/043* (2013.01); *F16H 57/0471* (2013.01); *F01L 1/047* (2013.01); *F01L 2001/3443* (2013.01); *F01L 2001/3445* (2013.01); *F01L 2001/34433* (2013.01); *F01L 2001/34469* (2013.01); *F01L 2001/34486* (2013.01)

(58) Field of Classification Search
CPC . F01L 1/3442; F01L 2001/3445; F01L 1/026; F01L 2001/3443; F01L 2001/34433; F01L 2001/34486
USPC ............................................ 123/90.15, 90.17
See application file for complete search history.

(56) References Cited

U.S. PATENT DOCUMENTS

| | | | |
|---|---|---|---|
| 3,331,256 A * | 7/1967 | Morris ................ | F16H 35/008 123/90.15 |
| 7,305,948 B2 | 12/2007 | Heintzen et al. | |
| 2016/0032790 A1 | 2/2016 | David et al. | |

\* cited by examiner

*Primary Examiner* — Ching Chang
(74) *Attorney, Agent, or Firm* — Davidson, Davidson & Kappel, LLC

(57) ABSTRACT

A camshaft assembly for an internal combustion engine is provided. The camshaft assembly includes a first gear; a second gear; a hydraulically driven phasing assembly configured for varying the relative phasing of the second gear with respect to the first gear; and an idler shaft supporting the first gear. A method of constructing a camshaft assembly for an internal combustion engine is also provided. The method includes fixing a first gear and a second gear together via a hydraulically driven phasing assembly configured for varying the relative phasing of the second gear with respect to the first gear; and providing the first gear on an idler shaft.

20 Claims, 7 Drawing Sheets

CAMSHAFT PHASING SYSTEM INCLUDING IDLER GEAR PHASER FOR INTERNAL COMBUSTION ENGINES

The present disclosure relates generally to camshaft phasing systems and more specifically to an idler gear phaser.

BACKGROUND

U.S. Pat. No. 7,305,948 B2 discloses a cam phasing system for a double overhead camshaft (DOHC) configuration.

U.S. Pub. 2016/0032790 A1 describes an accessible solenoid valve; however, the spool valve portion is not accessible and the valve body assembly mounts to the engine itself.

SUMMARY OF THE INVENTION

A camshaft assembly for an internal combustion engine is provided. The camshaft assembly includes a first gear; a second gear; a hydraulically driven phasing assembly configured for varying the relative phasing of the second gear with respect to the first gear; and an idler shaft supporting the first gear.

A method of constructing a camshaft assembly for an internal combustion engine is also provided. The method includes fixing a first gear and a second gear together via a hydraulically driven phasing assembly configured for varying the relative phasing of the second gear with respect to the first gear; and providing the first gear on an idler shaft.

BRIEF DESCRIPTION OF THE DRAWINGS

The present invention is described below by reference to the following drawings, in which.

DETAILED DESCRIPTION

The present disclosure provides a cam phasing system for a "V" engine timing drive having a single overhead camshaft (SOHC) configuration to phase timing equally on all valve actuations, and engine configurations, including the actuations of intake valves and exhaust valves on a single camshaft for each of the two banks. The cam phasing system also includes a number of advantageous features.

Alignment pins locate a stator to a crank gear, which also sets the alignment pin lash, with managed tolerances, whereas conventionally, setting of alignment pin lash requires complex manufacturing equipment and added cost.

A valve body assembly (VBA), which houses an oil control valve, mounts on the retainer assembly at the end of an idler shaft, making the valve body assembly accessible and serviceable. A radial seal mounted in the gear train cover of the engine is utilized to seal the clearance gap between an outer surface of the round section of the VBA protruding from the gear train cover and the cover itself, preventing oil leakage from inside the engine and other debris from entering the engine. In contrast, conventionally, the locations of the VBA and oil control valve make it difficult to access and service these components. The retainer assembly has two offset pins that align the idler shaft to the VBA and corresponding oil passages.

One or more plain bearing(s) are pressed into the cam gear, then oil holes are machined and the inner diameter of the bearing is honed after to avoid forming of burrs and shavings that can partially obstruct the oil holes in conventional designs wherein plain bearings are pressed-in.

Accommodating oil control galleries for the camshaft phaser is typically costly and complex. In the present disclosure, oil galleries for control of the phaser are machined into the idler shaft, and these galleries interface with drillings within a retainer assembly that serves as a thrust bearing support and a mounting interface for the valve body assembly. Therefore, no additional parts or complex oil drillings within the engine are needed.

A camshaft phaser is advantageously applied to a single idler gear for control of the phasing of two camshafts of a SOHC configuration, in contrast to conventional designs in which multiple phasers are applied to each camshaft, which can be costly and offer significant packaging challenges.

Figure 1:
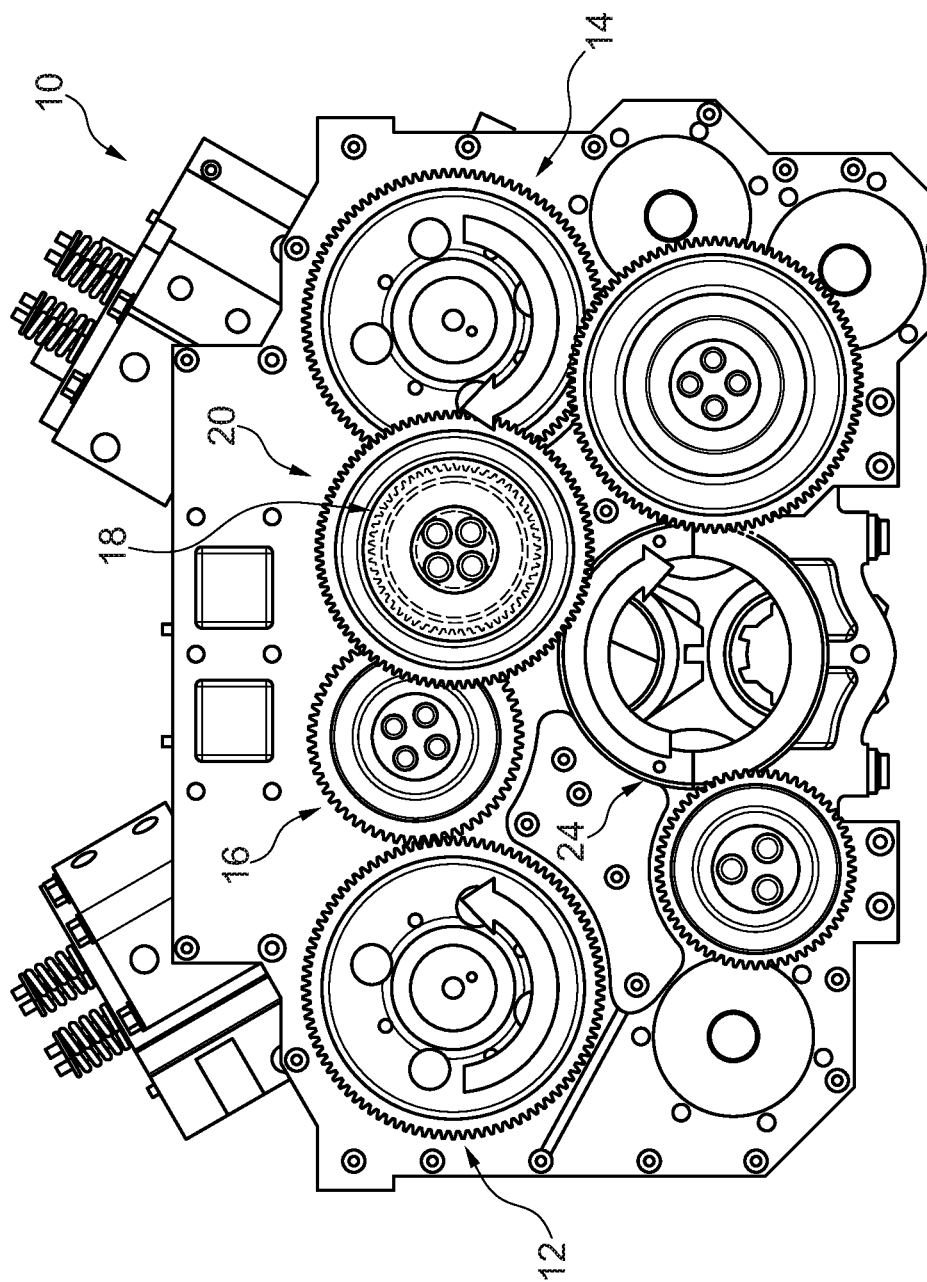
FIG. 1 shows a gear train assembly of an internal combustion engine in accordance with an embodiment of the present invention.

FIG. 1 shows a gear train assembly 10 of an internal combustion engine in accordance with an embodiment of the present invention. Gear train 10 has a SOHC configuration including two camshafts. A first camshaft is connected to a first cam gear 12 and a second camshaft is connected to a second cam gear 14. Cam gears 12, 14 are coupled together by two idler gears 16, 18, which are intermeshed with each other. A first idler gear 16 is intermeshed with first cam gear 12 and a second idler gear 18 is intermeshed with second cam gear 14. In accordance with an embodiment of the present invention, a third idler gear 20 is coaxial with second idler gear 18 and drives second idler 18 via a phasing assembly 22, which is shown in FIGS. 2 to 7. Third idler gear 20 is intermeshed with a crankshaft gear 24, which is fixed to a crankshaft of the internal combustion engine. Accordingly, crankshaft gear 24 drives third idler gear 20, which in turns drives second idler gear 18, which drives both first idler gear 16 and second cam gear 14, while first idler gear 16 drives first cam gear 12.

Figure 2:
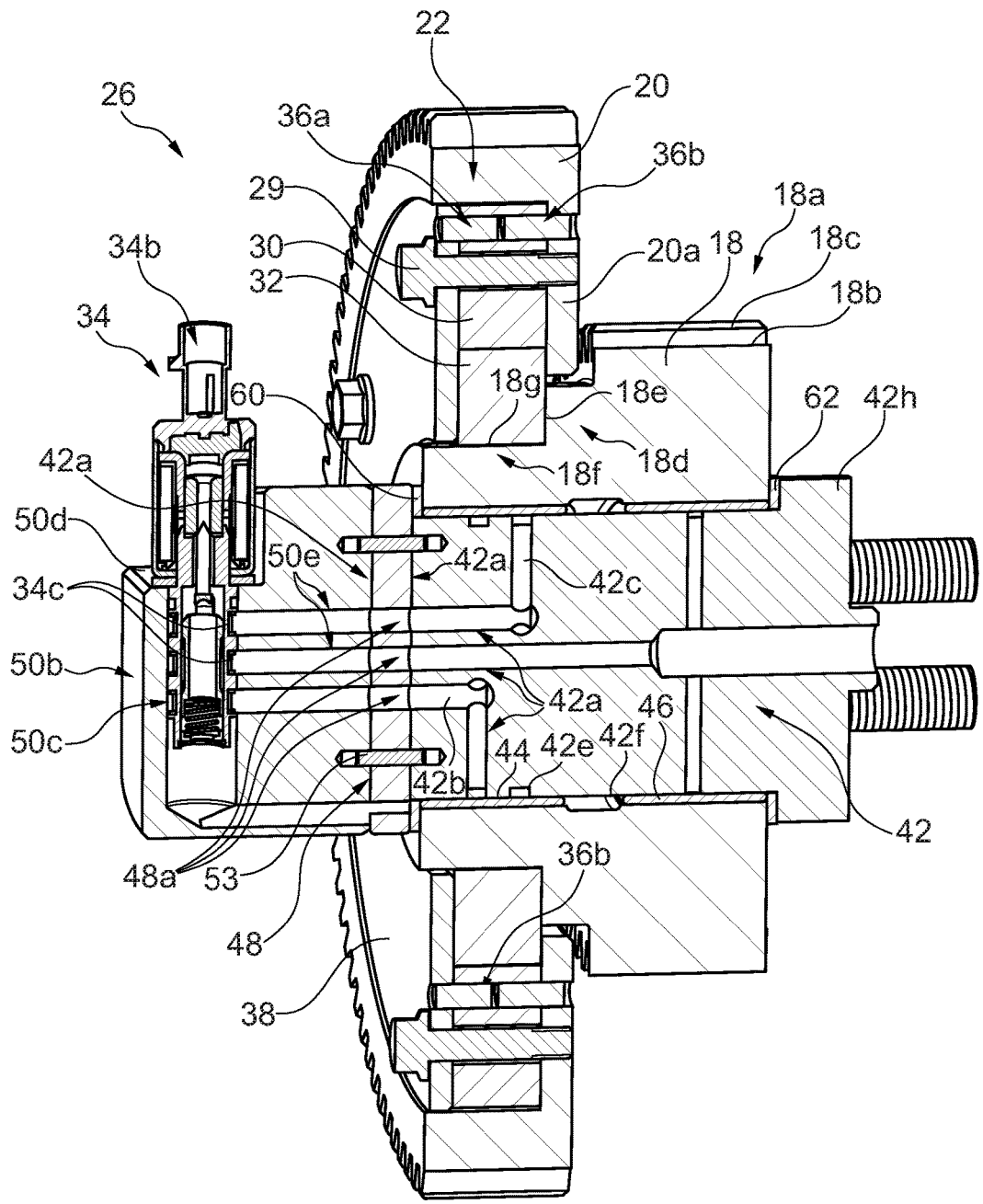
FIG. 2 shows a cross-sectional perspective view of cam phasing system in accordance with an embodiment of the present invention.
Figure 3:
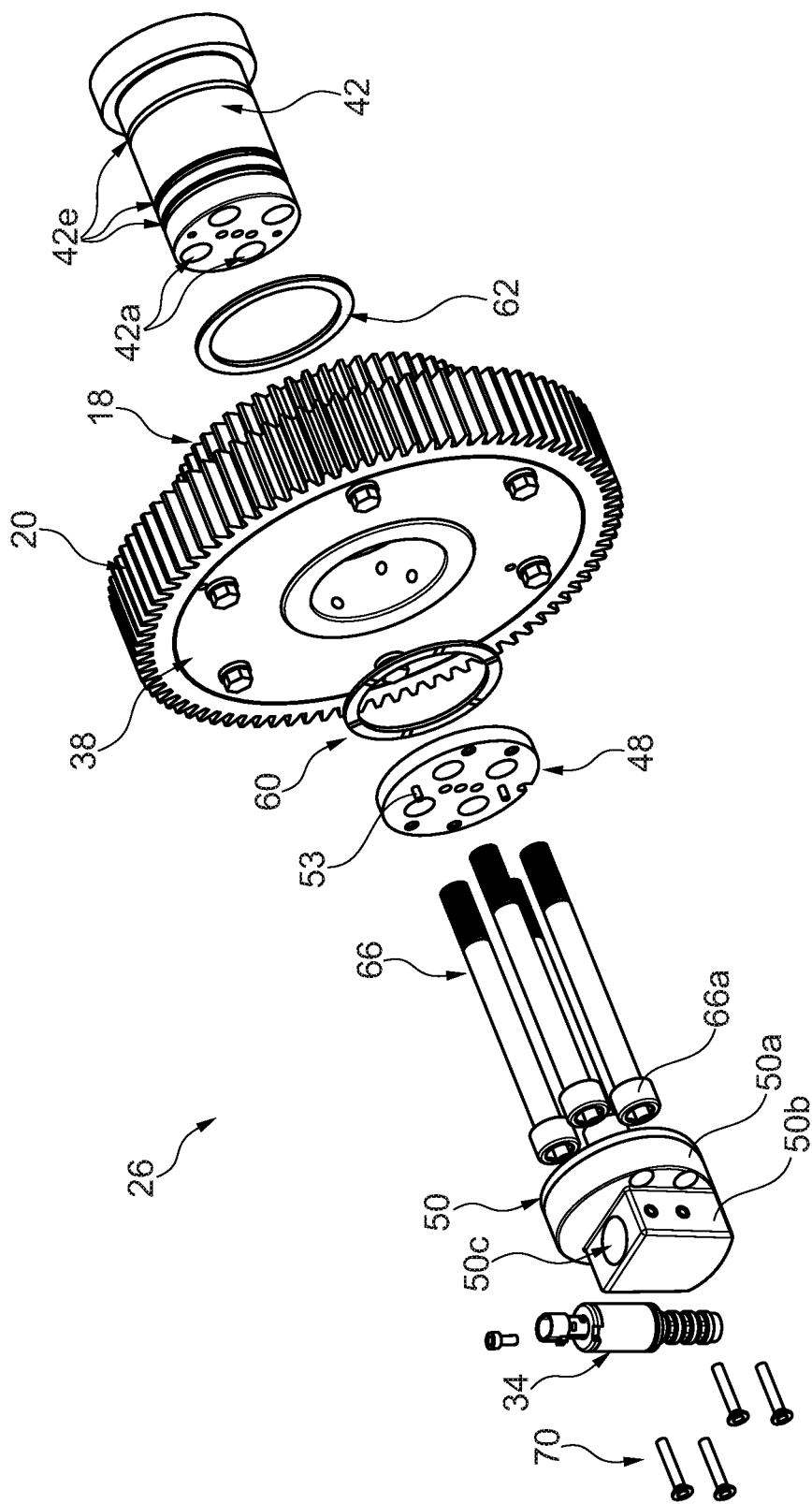
FIG. 3 shows an exploded view of the cam phasing system shown in FIG. 2.
Figure 4:
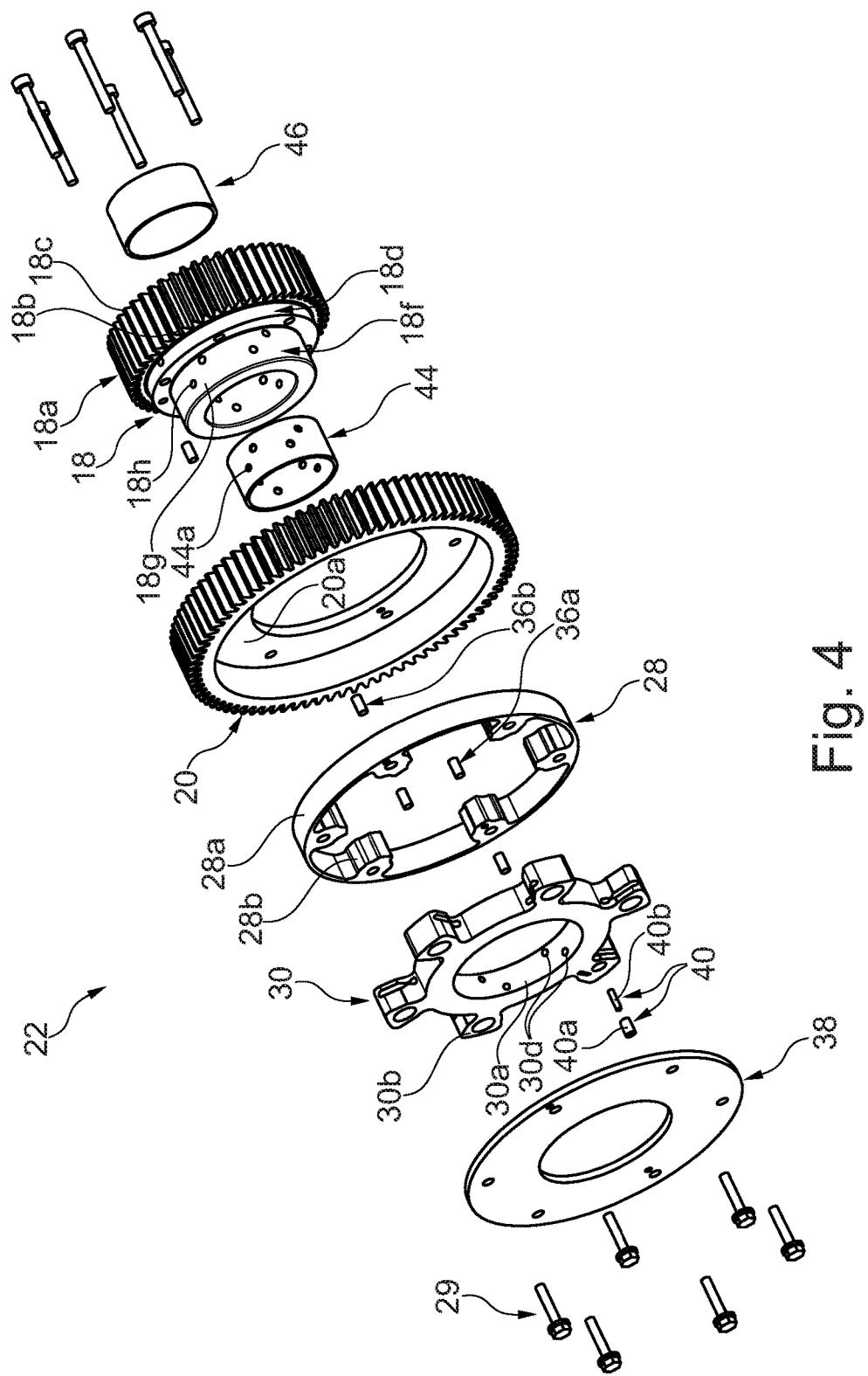
FIG. 4 shows an exploded view of a phaser assembly of the cam phasing system shown in FIGS. 2 and 3.
Figure 5:
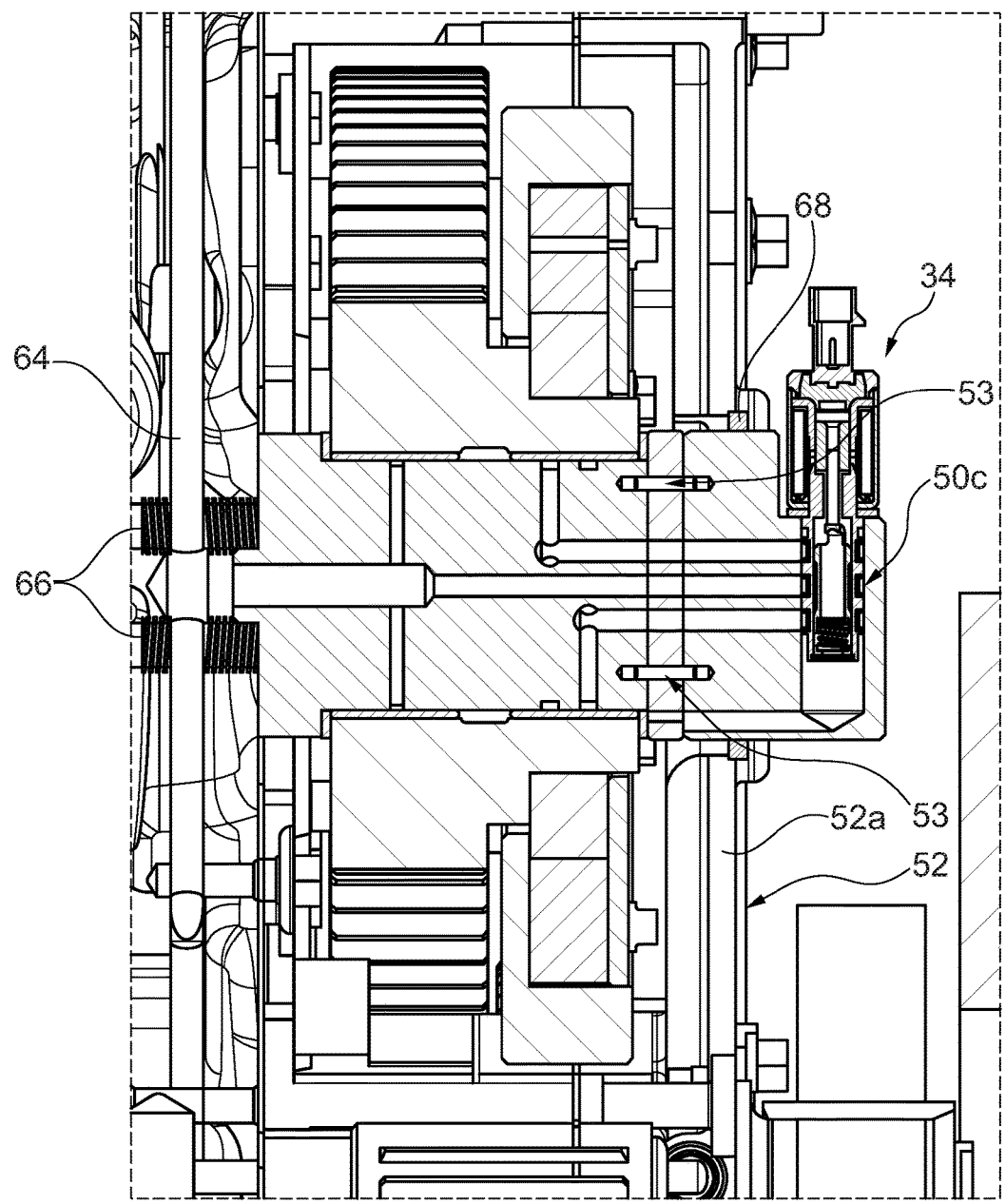
FIG. 5 shows a cross-sectional side view of the cam phasing system shown in FIG. 2 connected to components of the gear train assembly.
Figure 6:
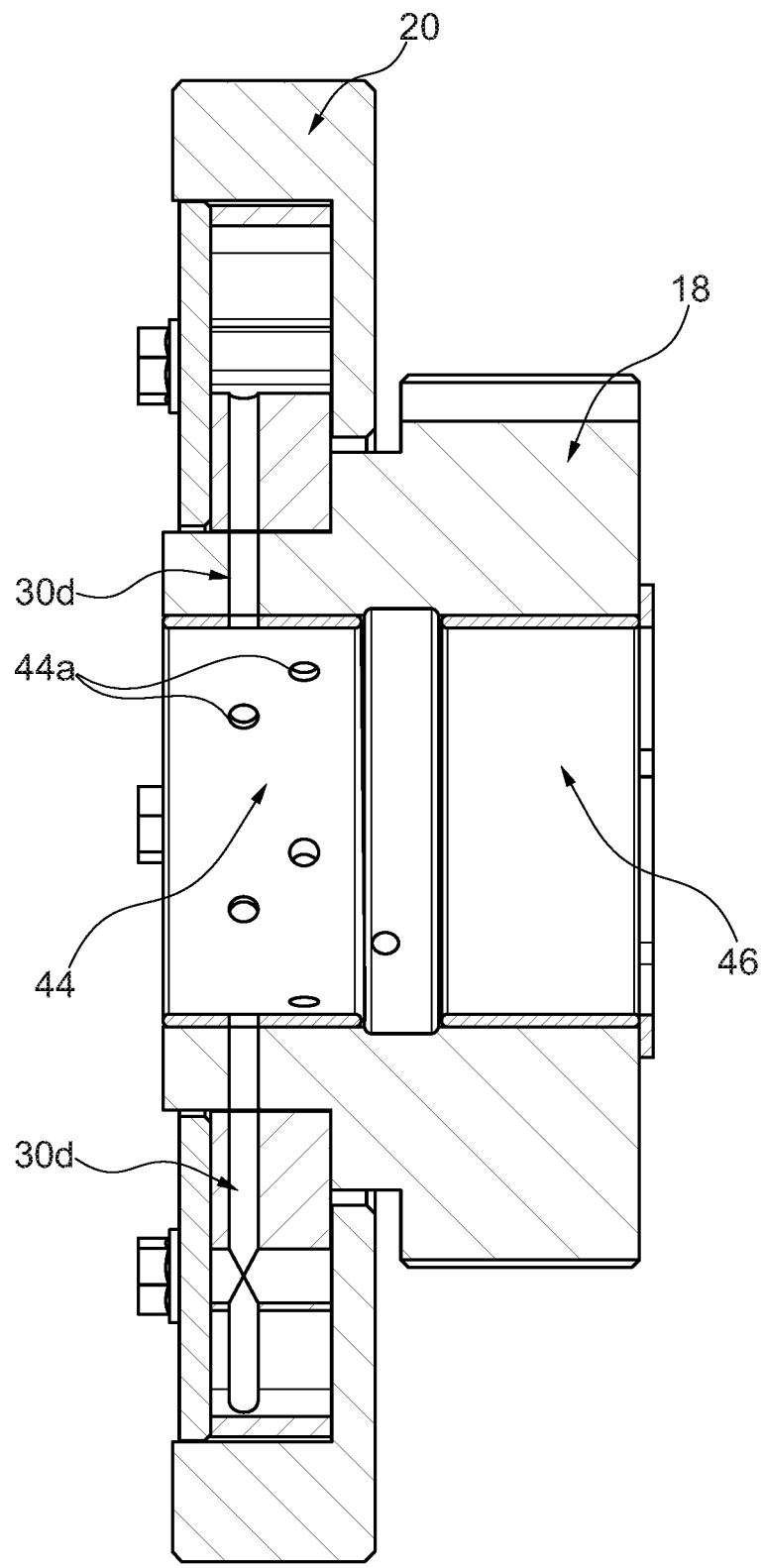
FIG. 6 shows a cross-sectional side view of idler gears, a phasing assembly and bearings of the cam phasing system shown in FIG. 2.

FIGS. 2 to 6 show different views of a cam phasing system 26 in accordance with an embodiment of the present invention. FIG. 2 shows a cross-sectional perspective view of cam phasing system 26. FIG. 3 shows an exploded view of cam phasing system 26. FIG. 4 shows an exploded view of cam phaser assembly 22. FIG. 5 shows a cross-sectional side view of cam phasing system 26 connected to components of gear train assembly 10. FIG. 6 shows a cross-sectional side view of idler gears 18, 20, phasing assembly 22 and bearings 44, 46.

Cam phasing system 26 includes idler gears 18, 20 coupled together by phasing assembly 22, with idler gear 18 being the driving gear, as it drives cam gear 14, and idler gear 16 as mentioned above, and idler gear 20 being the driven gear, as it is driven by crankshaft gear 24 as mentioned above. Phasing assembly 22 is hydraulically driven and includes a stator 28, which is fixed to a radially extending section 20a of idler gear 20 by bolts 29, and a rotor 30, which is rotatable within stator 28 by fluid supplied from an oil control valve 34 to vary the relative phasing of idler gear 18 with respect to idler gear 20 in a known manner.

Stator 28, which is shown in detail in FIG. 4, includes a ring 28a defining an outer circumference thereof and a plurality of circumferentially spaced webs 28b protruding radially inward from ring 28a. Webs 28b are provided with axially extending holes such that each web 28b receives a first alignment pin 36a on a front side thereof and a second alignment pin 36b on a rear side thereof. Each first alignment pin 36a is received in a corresponding hole in a locking cover 38, while each second alignment pin 36b is received in a corresponding hole in radially extending section 20a of idler gear 20. A locking mechanism 40 is received in an axially extending hole in rotor 30 and includes a spring 40b for forcing a pin 40a into a groove in locking cover 38 such that rotor 30 is locked with respect to cover during shutdown and subsequent start-up. In order for locking mechanism to have the appropriate lash with respect to locking cover 38, alignment pins 36a, 36b set the required locking clearance or lash for the locking mechanism 40 and set the location of stator 28 with respect to radially extending section 20a, which is disc shaped and forms a sealing cover. Bolts 29 extend through locking cover 38 and webs 28b into radially extending section 20a while alignment pins 36a, 36b space locking cover 38 from radially extending section 20a a predetermined distance.

Rotor 30, which is shown in detail in FIG. 4, includes a ring 30a defining an inner circumference thereof and a plurality of circumferentially spaced vanes 30b protruding radially outward from ring 30a. Each vane 30b is provided within stator 28 between two webs 28b such that fluid chambers formed radially between rings 28a, 30a and circumferentially between adjacent webs 28b and vanes 30b can be pressurized to vary the relative phasing of idler gear 20 with respect to idler gear 18.

Idler gear 18 has a stepped outer surface and includes an outer step section 18a having an outermost circumferential surface 18b provided with teeth 18c. Axially offset from and radially inside of outer step section 18a, idler gear 18 includes an intermediate step section 18d including a radially extending surface 18e contacting a radially extending surface of ring 30a. Axially offset from and radially inside of intermediate step section 18d, idler gear 18 includes an inner step section 18f including an outer circumferential surface 18g that is nonrotatably fixed to an inner circumferential surface 30c of ring 30a.

Idler gear 18 is supported on an idler shaft 42 by a front plain bearing 44 and a rear plain bearing 46. At a front side of idler shaft 42, a first thrust washer 60 is provided at a radially extending surface 42a of idler shaft 42 and retainer assembly 48 is fixed to idler shaft 42. A second thrust washer 62 is provided sandwiched between a back side radially extending surface of idler gear 18 and an outer annular ring 42h of idler shaft 42. Retainer assembly 48 is formed as a disc including a plurality of axially extending channels 48a passing therethrough. A valve body assembly 50 is fixed to a front side of retainer assembly 48. Valve body assembly 50 includes a disc shaped base 50a for contacting retainer assembly 48 and a support section 50b for receiving oil control valve 34. Support section 50b includes a vertically extending blind hole 50c extending downward from a top surface 50d of support section 50 and a bottom end of oil control valve 34 is removable fixed inside of blind hole 50c. Oil control 34 valve is mounted on VBA at surface 50d with a screw for ease of serviceability and includes a downward facing annular shoulder 34a on a top surface 50d of support section 50b. In order to align idler shaft 42 with valve body assembly 50, alignment dowels 53 are provided to pass axially through holes in retainer assembly 48, with one end of each dowel 55 being received in a blind hole in idler shaft 42 and the other end of each dowel 53 being received in a blind hole in valve body assembly 50 to align channels 48. Valve body assembly 50 is mounted onto retainer assembly 48 by a plurality of mounting bolts 70.

Figure 7:
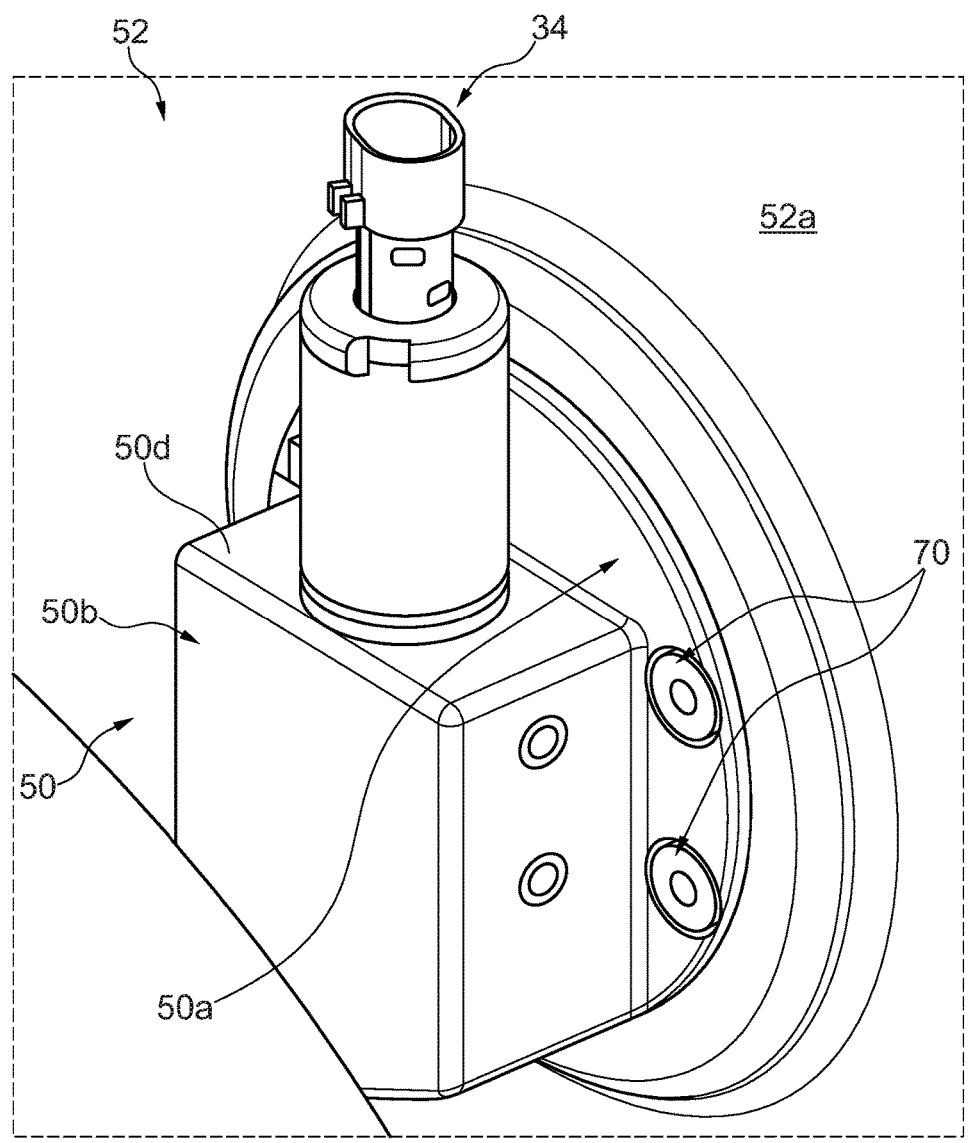
FIG. 7 shows a perspective view illustrating a valve body assembly of the cam phasing system shown in FIG. 2 protruding outside of a wall of a gear train cover of the gear train assembly.

FIG. 7 shows a perspective view illustrating valve body assembly 50 protruding outside of a wall 52a of a gear train cover 52 of gear train assembly 10. Support section 50b and oil control valve 34 are positioned outside of outer gear train cover 52 for ease of serviceability of oil control valve 34 and base 50a is held within wall 52a. Referring to FIG. 5, at a back side thereof, idler shaft 42 is fixed to a support 64 of gear train assembly 10 inside gear train cover 52 by fasteners 66. Valve body assembly 50 includes blind holes each for receiving of heads 66a of fasteners 66 such that valve body assembly 50 covers the heads 66a of fasteners 66. Additionally, valve body assembly 50 is sealingly held in wall 52a by a radial seal 68 positioned at an outer diameter surface of base 50a for sealing the outer diameter surface of the valve body assembly 50 from the engine oil.

Referring back to FIGS. 2 to 6, oil control valve 34 at a top end thereof includes a fluid inlet 34b for receiving fluid. Valve body assembly 50 includes a plurality of channels 50e, which are aligned with fluid outlets 34c of oil control valve 34, extending axially from blind hole 50c to channels 48a in retainer assembly 48, with each of channels 48a being aligned with one of channels 50e . Valve body assembly 50 is substantially solid with the channels 50e and blind hole 50c being machined into valve body assembly. Each of channels 48a is also aligned with one of channels 42b formed in idler shaft 42. Channels 42b each include an axially extending section 42c extending from channels 48a and radially extending surface 42a and at least one radially extending section 42d each extending from the respective sections 42c to an annular groove 42e formed in an outer circumference surface 42f of idler shaft 42. In this embodiment, two of annular grooves 42e are positioned at plain bearing 44 and one of grooves 42e is positioned at plain bearing 46.

Plain bearing 44 is provided with a plurality of radially extending holes 44a passing from the inner circumferential surface to the outer circumferential surface thereof. Each of radially extending holes 44a is aligned with one of the radially extending holes 18h extending from the inner circumferential surface to the outer circumferential surface of inner step section 18f. Similarly, each of radially extending holes 18h is aligned with one of the radially extending holes 30d extending from the inner circumferential surface of stator ring 30a into the fluid chambers such that can be supplied to the fluid chambers, i.e., the advance and retard chambers, formed between stator 28 and rotor 30. Radially extending holes 44a, 18h and 30d are advantageously machined into bearing 44, idler gear 18 and rotor 30, respectively. In one preferred embodiment, bearing 44 is pressed into gear 18 before holes 44a are machined therein, then oil holes 44a are machined and then inner diameter of the bearing is honed thereafter to avoid forming of burrs and shavings that can partially obstruct the oil holes in conventional designs wherein plain bearings are pressed-in. Accordingly, oil feed to the advance/retard chamber is provided with direct drillings through the plain bearing 44 without oil feed grooves for lubrication, allowing larger bearing area and avoiding cross-talk between the two different oil feed channels. The oil feed channels 42*b* are located in the idler shaft 42 that in turn provides lubrication fluid to the journal interface.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A camshaft phaser assembly for an internal combustion engine comprising:
    a first gear;
    a second gear;
    a hydraulically driven phasing assembly configured for varying a relative phasing of the second gear with respect to the first gear;
    an idler shaft supporting the first gear; and
    a valve body assembly fixed to the idler shaft, the valve body assembly configured to receive an oil control valve.

2. The camshaft phaser assembly as recited in claim 1 further comprising a plain bearing at an outer circumference of the idler shaft, the plain bearing including a plurality of radially extending holes extending therethrough.

3. The camshaft phaser assembly as recited in claim 2 wherein the idler shaft includes a plurality of idler shaft channels machined therein for supplying oil to the radially extending holes in the plain bearing.

4. The camshaft phaser assembly as recited in claim 1 further comprising a retainer assembly fixing the valve body assembly to the idler shaft, the valve body assembly including valve body assembly channels extending from a valve body, the retainer assembly including retainer assembly channels aligning the valve body assembly channels with idler shaft channels in the idler shaft.

5. The camshaft phaser assembly as recited in claim 1 further comprising a radial seal mounted on an outer surface of the valve body assembly for mounting the valve body assembly in a wall of a gear train cover.

6. The camshaft phaser assembly as recited in claim 1 wherein the hydraulically driven phasing assembly includes a stator and a rotor, the camshaft phaser assembly further comprising alignment pins passing through the stator and into a radially extending section of the second gear to align the stator with the second gear.

7. The camshaft phaser assembly as recited in claim 1 wherein the first and second gears are idler gears.

8. The camshaft phaser assembly as recited in claim 1 wherein the first gear is a driving gear and the second gear is a driven gear.

9. The camshaft phaser assembly as recited in claim 8 wherein the second gear is for being driven by a crankshaft gear and the first gear is for driving a cam gear.

10. The camshaft phaser assembly as recited in claim 1 wherein the oil control valve includes a first end and a second end, the first end including a fluid inlet for receiving fluid and the second end including a fluid outlet for providing fluid to the idler shaft.

11. The camshaft phaser assembly as recited in claim 10 wherein the valve body assembly includes valve body assembly channels fluidly connecting the fluid outlet of the oil control valve to idler shaft channels in the idler shaft.

12. The camshaft phaser assembly as recited in claim 11 wherein the valve body assembly is fixed to the idler shaft by a retainer assembly that is axially between the idler shaft and the valve body assembly, the retainer assembly including retainer assembly channels fluidly connecting the valve body assembly channels to the idler shaft channels.

13. A method of constructing a camshaft phaser assembly for an internal combustion engine comprising:
    fixing a first gear and a second gear together via a hydraulically driven phasing assembly configured for varying a relative phasing of the second gear with respect to the first gear;
    providing the first gear on an idler shaft; and
    fixing a valve body assembly on an axial end of the idler shaft, and providing an oil control valve in the valve body assembly.

14. The method as recited in claim 13 further comprising pressing a plain bearing into the first gear at an inner circumference of the first gear and then machining the plain bearing to form a plurality of radially extending holes extending therethrough; and then honing an inner circumference of the plain bearing.

15. The method as recited in claim 14 further comprising machining a plurality of idler shaft channels into the idler shaft for supplying oil to the radially extending holes in the plain bearing.

16. The method as recited in claim 13 wherein the valve body assembly is in fluid communication with the idler shaft.

17. The method as recited in claim 13 wherein the fixing the valve body assembly on the axial end of the idler shaft includes providing a retainer assembly fixing the valve body assembly to the idler shaft, the retainer assembly including retainer assembly channels that align with valve body assembly channels in the valve body assembly and idler shaft channels in the idler shaft.

18. The method as recited in claim 13 further comprising mounting a radial seal in a gear train cover for sealing an outer circumferential surface of the valve body assembly from engine oil.

19. The method as recited in claim 13 wherein the hydraulically driven phasing assembly includes a stator and a rotor, the method further comprising passing alignment pins through the stator and into a radially extending section of the second gear to align the stator with the second gear and set a lash of a locking mechanism, the locking mechanism being configured for locking the rotor to a locking cover.

20. A camshaft phaser assembly for an internal combustion engine comprising:
    a first gear;
    a second gear;
    a hydraulically driven phasing assembly configured for varying a relative phasing of the second gear with respect to the first gear; and
    an idler shaft supporting the first gear, the hydraulically driven phasing assembly including a stator and a rotor, the camshaft phaser assembly further comprising alignment pins passing through the stator and into a radially extending section of the second gear to align the stator with the second gear, the alignment pins including a first alignment pin received in a front side of the stator and a second alignment pin received in a rear side of the stator.

\* \* \* \* \*